United States Patent
Xiong et al.

(10) Patent No.: US 10,987,717 B2
(45) Date of Patent: Apr. 27, 2021

(54) DEVICE FOR FIXING METAL TUBE WITH PLATE BY EXPANSION

(71) Applicants: CITIC Dicastal CO., LTD., Hebei (CN); CITIC BOHAI aluminum industries holding Co., LTD, Hebei (CN)

(72) Inventors: Guoyuan Xiong, Qinhuangdao (CN); Youdao Xing, Qinhuangdao (CN); Xiaowei Sun, Qinhuangdao (CN); Yongze Kang, Qinhuangdao (CN); Wei Liu, Qinhuangdao (CN)

(73) Assignees: CITIC Dicastal CO., LTD., Qinhuangdao (CN); CITIC BOHAI aluminum industries holding Co., LTD, Qinhuangdao (CN)

( * ) Notice: Subject to any disclaimer, the term of this patent is extended or adjusted under 35 U.S.C. 154(b) by 240 days.

(21) Appl. No.: 16/203,823

(22) Filed: Nov. 29, 2018

(65) Prior Publication Data
US 2019/0262890 A1 Aug. 29, 2019

(30) Foreign Application Priority Data
Feb. 28, 2018 (CN) .......................... 201810168716.0

(51) Int. Cl.
*B21D 39/20* (2006.01)
*B21D 39/06* (2006.01)
(Continued)

(52) U.S. Cl.
CPC .............. *B21D 39/20* (2013.01); *B21D 39/06* (2013.01); *B21K 25/00* (2013.01); *B23P 11/005* (2013.01)

(58) Field of Classification Search
CPC ........ B21D 39/06; B21D 39/08; B21D 39/20; B21D 41/02; B21D 41/021; B21K 25/00; B23P 11/005
(Continued)

(56) References Cited

U.S. PATENT DOCUMENTS

| 184,602 | A | * | 11/1876 | Engle | ..................... | B21D 39/06 |
| | | | | | | 29/243.518 |
| 417,323 | A | * | 12/1889 | John | ..................... | B21D 39/06 |
| | | | | | | 29/243.518 |

(Continued)

FOREIGN PATENT DOCUMENTS

| FR | 739479 A | 1/1933 |
| FR | 1142975 A | 9/1957 |

(Continued)

OTHER PUBLICATIONS

Database WPI Week 201765; "2017 Clarivate Analytics"; Apr. 2017; Thomson Scientific,London, GB; AN 2017-60143B XP002792247, -& RU 169 829 U1 (Univ Penza State Technological), 1 pg.

(Continued)

*Primary Examiner* — Edward T Tolan
*Assistant Examiner* — Katie L. Parr
(74) *Attorney, Agent, or Firm* — Cooper Legal Group, LLC

(57) ABSTRACT

A device for fixing a metal tube with a plate by expansion includes a pressure head, a jacket and an expansion block. The jacket is of a cylindrical structure having a bottom and provided with a plurality of openings on the side having the bottom and near the bottom, and threads are provided on inner wall of jacket; threads are provided on outer wall of pressure head, and threads on outer wall of pressure head are matched with threads on inner wall of jacket; a cone head is fixed below pressure head and has an outer surface in an inverted cone shape; the expansion block has an inner surface in an inverted cone shape, a plurality of extrusion heads are arranged on outer surface and pass through openings on the side of the jacket; and inner surface of the expansion block is fitted with outer surface of the cone head.

7 Claims, 1 Drawing Sheet

(51) Int. Cl.
  *B21K 25/00* (2006.01)
  *B23P 11/00* (2006.01)
(58) Field of Classification Search
  USPC .......................................... 72/393, 117, 317
  See application file for complete search history.

(56) References Cited

U.S. PATENT DOCUMENTS

| | | | | |
|---|---|---|---|---|
| 3,635,073 | A * | 1/1972 | Oliver | B21D 39/10 72/393 |
| 5,562,000 | A * | 10/1996 | Shultz, Sr. | B21D 39/20 72/393 |
| 8,562,331 | B2 * | 10/2013 | Schramm | B21D 41/026 72/393 |
| 2005/0126251 | A1* | 6/2005 | Oosterling | B21D 39/20 72/393 |
| 2007/0053740 | A1* | 3/2007 | Herrmann | B21D 39/20 403/52 |
| 2011/0215573 | A1* | 9/2011 | Tanaka | B21D 39/04 29/523 |
| 2017/0183920 | A1* | 6/2017 | Ribble | B21D 39/20 |

FOREIGN PATENT DOCUMENTS

| | | | |
|---|---|---|---|
| GB | 190918977 A | | 7/1910 |
| JP | 2014168784 A | * | 9/2014 |
| JP | 2014168784 A | | 9/2014 |
| RU | 169829 U1 | | 4/2017 |

OTHER PUBLICATIONS

Supplementary European Search Report in the European application No. 19158968.8, dated Jul. 1, 2019, 7 pgs.

* cited by examiner

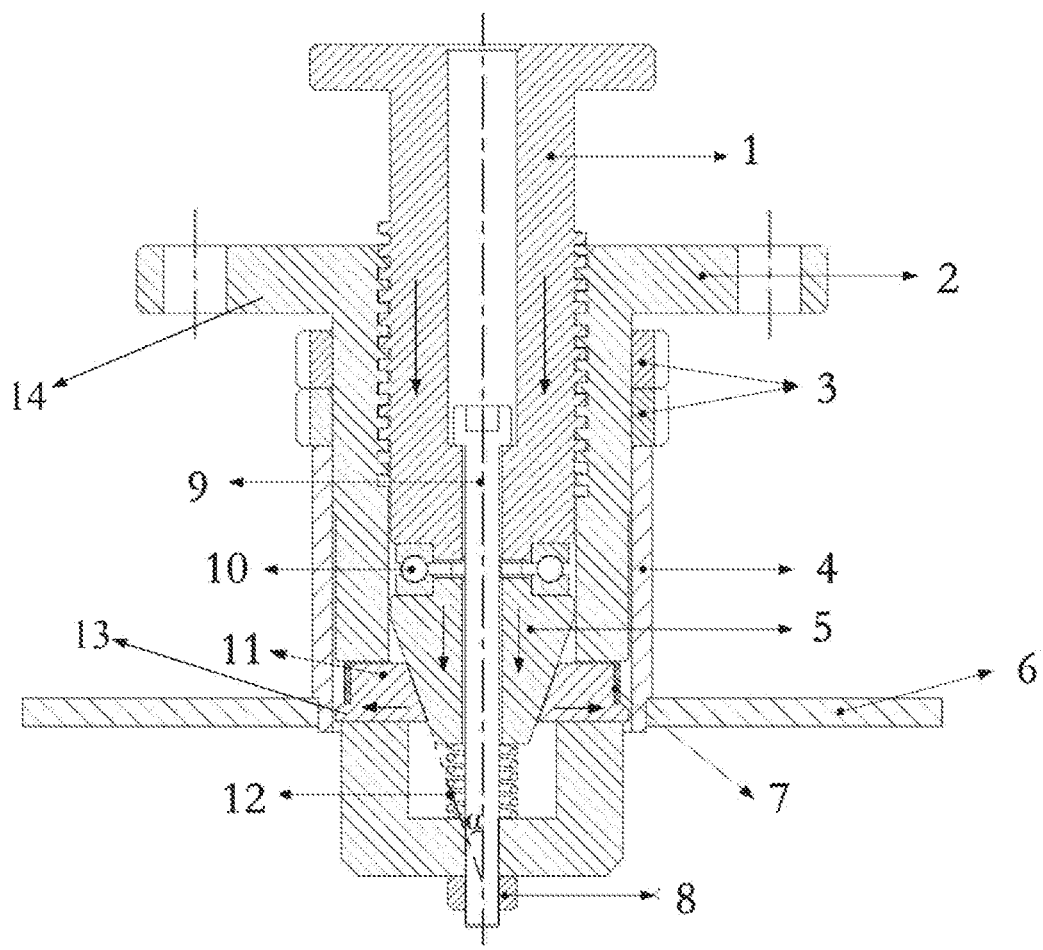

DEVICE FOR FIXING METAL TUBE WITH PLATE BY EXPANSION

CROSS-REFERENCE TO RELATED APPLICATIONS

The present application claims benefit of Chinese Patent Application No. 201810168716.0, filed on Feb. 28, 2018, the contents of which are hereby incorporated by reference in its entirety.

BACKGROUND

In the processing of metal materials and the production of metal parts, metal tubes are often fixed with plates by means of expansion.

At present, the common methods for connecting and fixing metal tubes with plates include welding, threaded connection and flange connection, which can meet the requirements of connection and fixing, but have the main disadvantages of low production efficiency and high production cost. However, the existing expansion process uses the principle of an expansion bolt, in which after the expansion is completed, the mandrel needs to be pulled out reversely, which is not applicable for a space having one end closed. The other expansion principle indicates that when an electric tube expansion machine drives a tube expander inserted into a tube to rotate clockwise, because a rotation angle can be formed between an expansion ball of the tube expander and the tube, the tube expander rotates forward along the axis of the tube, and because the tube expander is thin in the front and thick in the back, the tube is expanded slowly by rolling of the expansion ball and closely contacts the wall of the hole of the plate. The main disadvantage is that the tube must be expanded from one end to the other end, so the expansion on one side of the closed space cannot be completed. Another expansion principle is hydraulic expansion principle, in which high pressure hydraulic oil drives high pressure resistant rubber to extrude the inner wall of a tube so that the tube has plastic deformation and is expanded, and the main disadvantages are high cost and low production efficiency. The present disclosure solves the above problems well, is not limited by space, and is simple in operation and reliable in expansion. A pressure head of the device can also be connected with a servo motor to achieve precise control of the expansion force, so that the device is more suitable for production on high-efficiency production lines; and the device can be applied to the expansion of metal tubes of different specifications by adjusting the positions of a bolt and round nuts. The device has the characteristics of high production efficiency, no space limitation, strong applicability, simple and reliable structure, low cost and the like.

SUMMARY

The present disclosure relates to the technical field of metal material processing, and specifically, relates to a device for fixing a metal tube with a plate by expansion.

Accordingly, the object of the present disclosure is to provide a device for fixing a metal tube with a plate by expansion so as to overcome the above problems.

In one aspect of the present disclosure, provided is a device for fixing a metal tube with a plate by expansion, including a pressure head, a jacket and an expansion block, the jacket is of a cylindrical structure having a bottom, the jacket is provided with a plurality of openings on the side having the bottom and near the bottom, and threads are provided on the inner wall of the jacket; threads are provided on the outer wall of the pressure head, and the threads on the outer wall of the pressure head are matched with the threads on the inner wall of the jacket; a cone head is fixed below the pressure head and has an outer surface in an inverted cone shape; the expansion block has an inner surface in an inverted cone shape, a plurality of extrusion heads are arranged on the outer surface, and the extrusion heads pass through the openings on the side of the jacket; and the inner surface of the expansion block is fitted with the outer surface of the cone head.

In a preferred aspect of the present disclosure, the number of the expansion blocks is the same as the number of openings of the jacket, and is 2 to 6.

In a preferred aspect of the present disclosure, round nuts are arranged on the outer side of the jacket, and the round nuts are configured to fix the jacket with the metal tube to be fixed.

In a preferred aspect of the present disclosure, an annular wing plate is arranged at the upper end of the jacket, and the wing plate is provided with through holes.

In a preferred aspect of the present disclosure, a through hole is provided inside the pressure head, a bolt is arranged in the through hole, a reset spring is arranged between the cone head and the bottom of the jacket, the bolt passes through the hole inside the pressure head, and the end of the bolt is fixed to the jacket by a lock nut.

In a preferred aspect of the present disclosure, a thrust bearing is arranged between the pressure head and the cone head.

In a preferred aspect of the present disclosure, an elastic tightening belt is arranged on the peripheral surface of the expansion block, and the elastic tightening belt is an annular elastic body sleeved outside the expansion block.

In a preferred aspect of the present disclosure, the semi-apex angles of the conical surfaces of the lower surface of the cone head and the inner surface of the expansion block are 10-30 degrees.

In other aspect of the present disclosure, further disclosed is the following technical solution:

In the device of the present disclosure, the jacket is fixed, the pressure head downward rotates, the rotation movement is removed through the thrust bearing, the remaining axial movement acts on the cone head, the cone head extrudes the expansion block through the cone surface, the expansion block moves radially and extrudes the metal tube, the metal tube is plastically deformed and fixed on the metal plate, and the expansion of the metal tube is thus completed. The jacket is slotted at the expansion block, so that the expansion block can slide in the slotted direction under the extrusion force of the cone head to realize the expansion of the metal tube. When the pressure head rotates reversely, the pressure head moves up, and the cone head and the thrust bearing move up under the action of the reset spring, and press against the lower end of the pressure head; and the expansion block loses the radial extrusion force, and is radially contracted to the initial position under the action of the elastic tightening belt. A screwed connection is achieved between the pressure head and the jacket, the jacket is fixed, the pressure head rotates down or the pressure head rotates up to the upper bolt cap of the bolt, and the bolt mainly plays a role in limiting the movement of the pressure head and positioning the reset spring. The bolt is fixed in a threaded hole at the lower end of the jacket, and the stroke of the pressure head is adjusted by adjusting the depth of the bolt screwed into the threaded hole to adapt to the expansion of different metal tubes. After the bolt is screwed into the threaded hole, a lock nut is screwed to the end of the bolt extending out of the jacket to prevent the bolt from loosening. The round nuts mainly play a role in adjusting the positions of punching points, and can be adjusted according to the length of the metal tube to meet the expansion requirements of different metal tubes. After the two round nuts are tightened, they extrude each other in the axial direction to prevent loosening, thereby avoiding the change in the positions of the punching points due to the loosening of the round nuts. The thrust bearing mainly plays a role in transforming the downward rotation of the screw of the pressure head into downward movement and force, thereby avoiding the tangential friction between the rotating cone head and the expansion block. The number of the slots of the jacket is the same as the number of the expansion blocks, and the number of the expansion blocks is two or more. The expansion blocks are uniformly distributed about the axis in the space to ensure the force balance during plastic deformation of the metal tube. In order to ensure the efficiency of screw drive, the thread pair and the thrust bearing need to be lubricated with grease.

The device of the present disclosure is characterized in that the operation is simple and the fixing effect is good, point pressure fixing of the metal tube and the plate can be realized by simple rotation of the pressure head, and efficient and rapid production is realized.

BRIEF DESCRIPTION OF DRAWINGS

The embodiment of the present disclosure will be described in detail below in combination with the accompanying drawing, in which:

FIG. 1 is a schematic diagram of the structure of the device according to the present disclosure;

LIST OF REFERENCE SYMBOLS 1 pressure head
2 jacket
3 round nut
4 metal tube
5 cone head
6 plate
7 elastic tightening belt
8 lock nut
9 bolt
10 thrust bearing
11 expansion block
12 reset spring
13 extrusion head
14 annular wing plate
α a semiapex angle

DETAILED DESCRIPTION

Embodiment 1

In the present embodiment, the device of the present disclosure is described in combination with FIG. 1.

In the present embodiment, provided is a device for fixing a metal tube with a plate by expansion, the device including a pressure head, a jacket and an expansion block, in which the jacket is of a cylindrical structure having a bottom, the jacket is provided with a plurality of openings on the side having the bottom and near the bottom, and threads are provided on the inner wall of the jacket; threads are provided on the outer wall of the pressure head, and the threads on the outer wall of the pressure head are matched with the threads on the inner wall of the jacket; a cone head is fixed below the pressure head and has an outer surface in an inverted cone shape; the expansion block has an inner surface in an inverted cone shape, a plurality of extrusion heads are arranged on the outer surface, and the extrusion heads pass through the openings on the side of the jacket; and the inner surface of the expansion block is fitted with the outer surface of the cone head. The number of expansion blocks is the same as the number of the openings of the jacket, and is two or more. Round nuts are arranged on the outer side of the jacket, and the round nuts are configured to fix the jacket with the metal tube to be fixed. An annular wing plate is arranged at the upper end of the jacket, and the wing plate is provided with through holes. A through hole is provided inside the pressure head, a bolt is arranged in the through hole, a reset spring is arranged between the cone head and the bottom of the jacket, the bolt passes through the hole inside the pressure head, and the end of the bolt is fixed to the jacket by a lock nut. A thrust bearing is arranged between the pressure head and the cone head. An elastic tightening belt is arranged on the peripheral surface of the expansion block, and the elastic tightening belt is an annular elastic body sleeved outside the expansion block. The semiapex angles of the conical surfaces of the lower surface of the cone head and the inner surface of the expansion block are 18 degrees.

In the device of the present embodiment, the jacket is fixed, the pressure head downward rotates, the rotation movement is removed through the thrust bearing, the remaining axial movement acts on the cone head, the cone head extrudes the expansion block through the cone surface, the expansion block moves radially and extrudes the metal tube, the metal tube is plastically deformed and fixed on the metal plate, and the expansion of the metal tube is thus completed. The jacket is slotted at the expansion block, so that the expansion block can slide in the slotted direction under the extrusion force of the cone head to realize the expansion of the metal tube. When the pressure head rotates reversely, the pressure head moves up, and the cone head and the thrust bearing move up under the action of the reset spring, and press against the lower end of the pressure head; and the expansion block loses the radial extrusion force, and is radially contracted to the initial position under the action of the elastic tightening belt. A screwed connection is achieved between the pressure head and the jacket, the jacket is fixed, the pressure head rotates down or the pressure head rotates up to the upper bolt cap of the bolt, and the bolt mainly plays a role in limiting the movement of the pressure head and positioning the reset spring. The bolt is fixed in a threaded hole at the lower end of the jacket, and the stroke of the pressure head is adjusted by adjusting the depth of the bolt screwed into the threaded hole to adapt to the expansion of different metal tubes. After the bolt is screwed into the threaded hole, a lock nut is screwed to the end of the bolt extending out of the jacket to prevent the bolt from loosening. The round nuts mainly play a role in adjusting the positions of punching points, and can be adjusted according to the length of the metal tube to meet the expansion requirements of different metal tubes. After the two round nuts are tightened, they extrude each other in the axial direction to prevent loosening, thereby avoiding the change in the positions of the punching points due to the loosening of the round nuts. The thrust bearing mainly plays a role in transforming the downward rotation of the screw of the pressure head into downward movement and force, thereby avoiding the tangential friction between the rotating cone head and the expansion block. The number of the slots of the jacket is the same as the number of the expansion blocks, and the number of the expansion blocks is two or more. The expansion blocks are uniformly distributed about the axis in the space to ensure the force balance during plastic deformation of the metal tube. In order to ensure the efficiency of screw drive, the thread pair and the thrust bearing need to be lubricated with grease. The end, matched with the plate, of the metal tube can be machined with shaft shoulders, which are mainly for axial limitation and fixing to ensure the accuracy of the expansion position.

The invention claimed is:

1. A device for fixing a metal tube with a plate by expansion, comprising a pressure head, a jacket and an expansion block, wherein the jacket is of a cylindrical structure having a bottom, the jacket is provided with a plurality of openings on a side having the bottom and near the bottom, and threads are provided on an inner wall of the jacket; threads are provided on an outer wall of the pressure head, and the threads on the outer wall of the pressure head are matched with the threads on the inner wall of the jacket; a cone head is fixed below the pressure head and has an outer surface in an inverted cone shape; the expansion block has an inner surface in an inverted cone shape, a plurality of extrusion heads are arranged on the outer surface, and the extrusion heads pass through the openings on the side of the jacket; and the inner surface of the expansion block is fitted with the outer surface of the cone head, wherein a through hole is provided inside the pressure head, a bolt is arranged in the through hole, a reset spring is arranged between the cone head and the bottom of the jacket, the bolt passes through the through hole inside the pressure head, and an end of the bolt is fixed to the jacket by a lock nut.

2. The device for fixing a metal tube with a plate by expansion according to claim 1, wherein the number of the extrusion heads is the same as the number of openings of the jacket, and is 2 to 6.

3. The device for fixing a metal tube with a plate by expansion according to claim 1, wherein round nuts are arranged on an outer side of the jacket, and the round nuts are configured to fix the jacket with the metal tube to be fixed.

4. The device for fixing a metal tube with a plate by expansion according to claim 1, wherein an annular wing plate is arranged at an upper end of the jacket, and the annular wing plate is provided with through holes.

5. The device for fixing a metal tube with a plate by expansion according to claim 1, wherein a thrust bearing is arranged between the pressure head and the cone head.

6. The device for fixing a metal tube with a plate by expansion according to claim 1, wherein an elastic tightening belt is arranged on a peripheral surface of the expansion block, and the elastic tightening belt is an annular elastic body sleeved outside the expansion block.

7. The device for fixing a metal tube with a plate by expansion according to claim 1, wherein semiapex angles of conical surfaces of a lower surface of the cone head and the inner surface of the expansion block are 10-30 degrees.

\* \* \* \* \*